United States Patent [19]

Naylor

[11] 4,092,803
[45] June 6, 1978

[54] SELF-WATERING APPARATUS FOR PLANTS

[76] Inventor: Thomas H. Naylor, P.O. Box 370, Castle Rock, Colo. 80104

[21] Appl. No.: 710,436

[22] Filed: Aug. 2, 1976

[51] Int. Cl.$^2$ ............................................. A01G 31/00
[52] U.S. Cl. ........................................ 47/62; 239/568; 239/554; 251/153; 4/201
[58] Field of Search .................... 47/39, 59, 60, 62, 79; 251/142, 144, 153, 154, 155, 156; 4/198, 201, 203, 204, 205, 287; 137/625.2; 239/554, 568, 601

[56] References Cited

U.S. PATENT DOCUMENTS

| 516,323 | 3/1894 | Wolters | 251/144 X |
| 2,737,203 | 3/1956 | Marr | 251/144 X |
| 2,917,867 | 12/1959 | Bailey | 47/1.2 |
| 3,131,064 | 4/1964 | Malchair | 47/62 |
| 3,258,030 | 6/1966 | Clark, Jr. | 251/144 X |
| 3,300,895 | 1/1967 | Dosedla et al. | 47/81 |
| 3,323,253 | 6/1967 | Robins | 47/79 X |
| 3,624,692 | 11/1971 | Lux | 47/62 |
| 3,820,280 | 6/1974 | Gilgen | 47/79 |

FOREIGN PATENT DOCUMENTS

| 183,168 | 1/1906 | Germany | 47/81 |

Primary Examiner—E. H. Eickholt
Attorney, Agent, or Firm—H. Gordon Shields

[57] ABSTRACT

Apparatus is disclosed which provides for the efficient self-watering of plants from a moving flow of water in a display unit tray. The watering apparatus includes an interior upright drain conduit disposed within the tray. This conduit includes drain apertures providing a continual first flow of water from the tray. A cap including a top and a skirt extending downwardly substantially perpendicular to the top is disposed on the conduit and is movably adjustable thereon. A plurality of apertures extend through the skirt of the cap and communicate with the conduit to provide a selectively varied record flow of water from the tray in conjunction with a relieved portion on the conduit which selectively communicates with the plurality of apertures extending through the skirt of of the cap.

18 Claims, 5 Drawing Figures

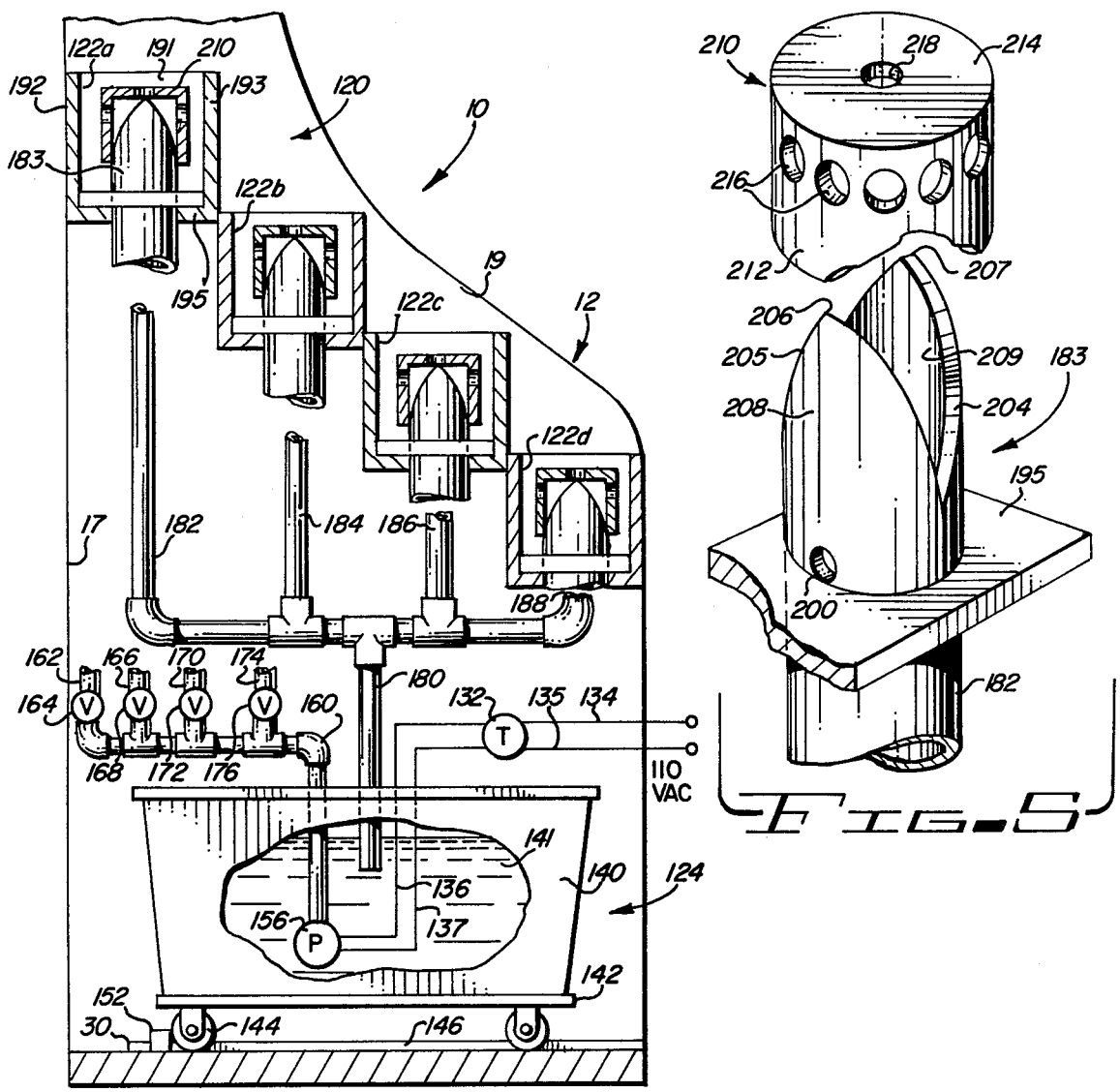
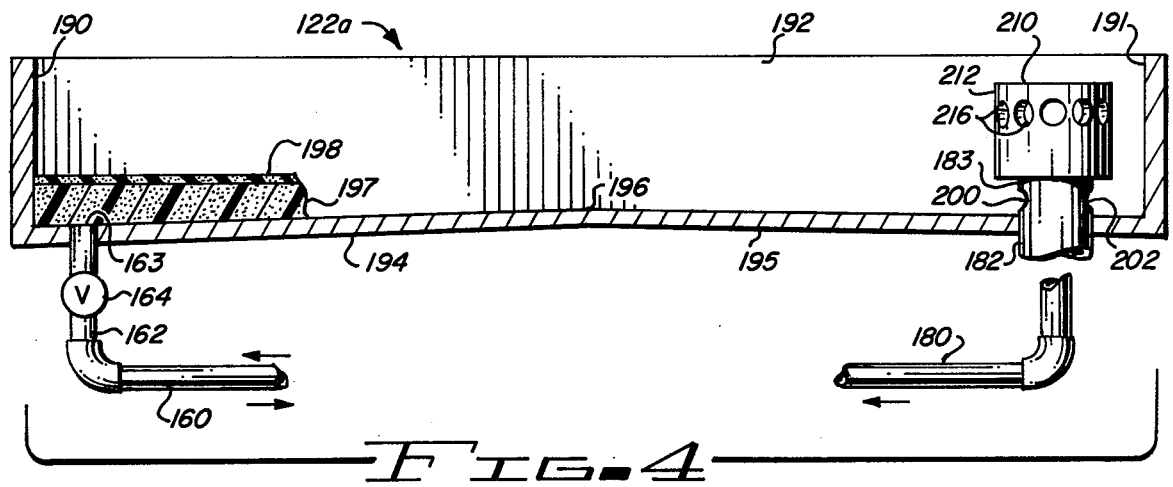

SELF-WATERING APPARATUS FOR PLANTS

BACKGROUND OF THE INVENTION

1. Field of the Invention:

This invention relates to display cases for plants, and, more particularly, to a self-watering display case for plants.

2. Description of the Prior Art:

Self-watering display apparatus for plants comprise, with respect to the prior art, simply trays in which the plants are disposed. Water is introduced into the trays and the water is allowed to stand in the trays for a period of time while the plants absorb water by capillary action. After a time, the water is allowed to drain from the trays. The amount of time involved is usually a substantial amount of time due to the length of time required for the plants, or the soil or potting compound in which the plants are planted, to absorb the water. At such time as the soil or potting compound is sufficiently moist, by the absorption of the water standing in the tray, the water is allowed to drain from the tray. However, the soil or potting compound absorbs water rather slowly from the standing water in the tray and accordingly the soil or potting compound, particularly at the bottom of a planter, is exposed to the water for a considerable length of time and the roots of the plant are accordingly subject to diseases, root rot, and the like. The loss ratio of such plants resulting from the prior art watering apparatus is about thirty percent.

The self-watering apparatus of the present invention provides a flow of water which moves the length of a tray or trough and substantially reduces the amount of time required for the watering process and the loss compared to other types of apparatus is substantially reduced from about thirty percent to about three percent.

SUMMARY OF THE INVENTION

The apparatus disclosed and claimed herein comprises a self-watering apparatus for the display of living plants including a water reservoir for providing water to a trough in which the plants are disposed and a pump to provide a flow of water through the trough in which the plants are disposed. The water returns to the reservoir after the completion of the watering cycle through a drain at one end of the trough and through the supply inlet at the opposite end of the trough.

Among the objects of the present invention are the following:

To provide new and useful self-watering apparatus for plants;

To provide new and useful apparatus for providing a flow of water in a trough;

To provide new and useful apparatus for draining water from a trough;

To provide new and useful self-watering display apparatus having a flow of water for watering plants disposed in a trough in the apparatus;

To provide new and useful trough apparatus for displaying plants and for watering the plants displayed in the trough; and To provide new and useful automatic watering apparatus for watering plants disposed in a display case.

BRIEF DESCRIPTION OF THE DRAWING

FIG. 3 is a schematic view of a portion of the apparatus of FIG. 1 taken generally along line 3—3 of FIG. 1.

FIG. 4 is a schematic representation of a single tray incorporated into the present invention, illustrating the water supply system for each tray.

FIG. 5 is an enlarged view, partially exploded, of a portion of the apparatus of FIG. 4.

DESCRIPTION OF THE PREFERRED EMBODIMENT

Figure 1:
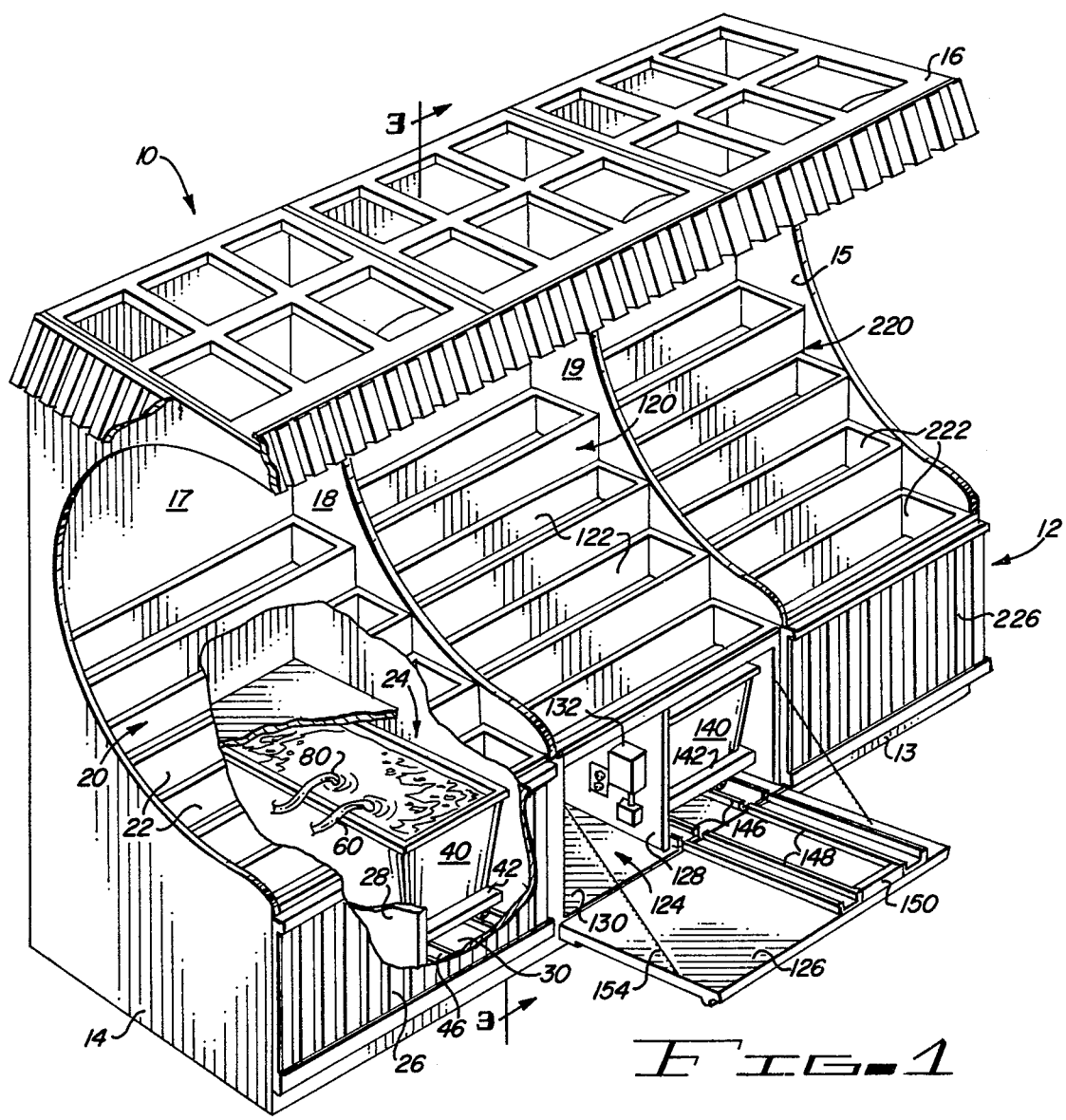
FIG. 1 is a perspective view of self-watering apparatus for plants of the present invention with a portion of the apparatus broken away, and a portion open, to show various features of the apparatus.

FIG. 1 comprises a perspective view, with a portion broken away, of self-watering apparatus for plants 10 of the present invention. The apparatus 10 includes a housing 12 which is divided into three sections, sections 20, 120, and 220. The housing includes a base 13, a pair of sides 14, and 15, a top 16, and a back 17. Sections 20 and 120 are separated by a divider 18, and sections 120 and 220 are separated by a divider 19. Within each section is a plurality, namely 4, of trays.

Within section 20 is shown a plurality of trays 22, within section 120 is disposed a plurality of trays 122, and within section 220 is disposed a plurality of trays 222. As illustrated, the trays are arranged in a "step" orientation with the lowest tray being disposed adjacent the front of the apparatus, and the highest tray being disposed at the rear of the apparatus, adjacent the back 17.

In each section, and beneath the plurality of trays, is a cabinet closed by a door. Section 20 accordingly includes a cabinet 24 closed by a door 26; section 120 includes a cabinet 124 closed by a door 126; and section 220 also includes a cabinet (not shown) but which is closed by a door 226. The door 26 for cabinet 24 is shown in the closed position but partially broken away. The trays 22 in the upper portion of the section are also partially broken away to show apparatus disposed within the cabinet. The door 126 of the cabinet 124 is shown in its full "down" or open position. The door 226, as indicated above, is shown in its full "up" or closed position, completely enclosing or closing off the cabinet within section 220. As may be clearly seen in FIG. 1, the respective doors comprise the front of the apparatus 10. The doors are beneath the trays which are used to display the plants.

The top 16 serves a functional purpose as well as a decorative purpose. Preferably, fluorescent lights are secured beneath the top to provide continuous light for the plants disposed in the trays to enhance the growth of the plants. Obviously, the top 16 also provides a decorative effect for the housing and for the overall apparatus to enhance its aesthetic appeal.

With respect to the aesthetics of the apparatus, it is noted that the sides 14 and 15 and the dividers 18 and 19 extend in a curve from the upper portion of the doors which cover the cabinets at the lower front portion of the housing to the top. The curvature of the sides is rearwardly and slightly upwardly to about the area of the highest (rear) tray. Thus the curvature extends forwardly as it continues upwardly to join the forward portion of the top 16. The partitions or dividers 18 and 19 include similar curves. The respective sides and dividers accordingly provide an aesthetic appeal for the apparatus. The dividers, and the sides, also serve as support partitions for the trays and, beneath the trays, the dividers and sides, with the lower portion of the back and the respective doors, define and enclose the respective cabinets.

Each cabinet is divided into a pair of compartments by a vertical partition which extends from the front of each compartment, adjacent the door, when the door is in the closed position, to the back 17. A partition 28 is shown dividing cabinet 24 into two compartments, and a partition 128 is shown dividing cabinet 124 into two compartments. The partitions also serve as vertical supports for the trays in addition to their function as dividing the cabinets into compartments. A third function is served by the partitions in providing support for electrical controls and circuitry.

Within one of the compartments in each cabinet is a tank disposed on a tandem wheeled platform. The tandem wheels of the platform are in turn disposed within pairs of tracks or guides which allow each tank and platform to be rolled into and out of its respective compartment within each cabinet. For example, within cabinet 24 is shown a tank 40 disposed on a platform 42. Within cabinet 124 is shown a tank 140 disposed on a platform 142. Four wheels, comprising two pairs of tandem wheels, are in turn secured to the platform 142 and the wheels are disposed within tracks or guides 146. The tracks or guides 146 are secured to a floor 130 of the cabinet 124.

In order to move tank 140 out of its compartment, additional tracks or guides 148 are shown secured to the door 126. Accordingly, when the door 126 is in its down position, as illustrated in FIG. 1, the tank 140 may roll out to the edge of the door in the tracks or guides 148. At the outermost edge of the door 126, and disposed substantially perpendicular to the tracks or guides 148, is a stop 150 which limits the movement of the tank outwardly from its compartment.

The door 126 is shown supported in its down position by a pair of chains 154, which may be appropriately secured to both the housing and the door. Obviously, the chains must be strong enouth to support not only the door, but also the tank filled with water.

The door is also fastened to the floor 130 of the housing 12, by appropriate hinges, such as piano hinges, T hinges, or the like. To secure the doors in the upright position, appropriate locking means may also be employed. These hinges, locks and supports, such as eye bolts, for the chains, are well known in the art.

With respect to the guides or tracks 146 and 148, within the cabinet 124 and on the door 126, and the guides and tracks for the other tanks in the other cabinets, any appropriate pair of parallel guides may be used for each pair of tandem wheels. That is, the platforms, such as platform 142, preferably have secured thereto four wheels in parallel and tandem relationship, with a pair of wheels in tandem on each side of the platform, and each such pair is guided or confided within a pair of guides or tracks. The least expensive example of such guides or tracks may be simply a pair of wood strips secured to the floor of the cabinet and also to the door. Obviously, appropriate compensation must be made at the juncture of the floor of the cabinet and the door to prevent interference between the guides on the floor of the cabinet and the guides on the door as the door is closed against the housing.

Figure 2:
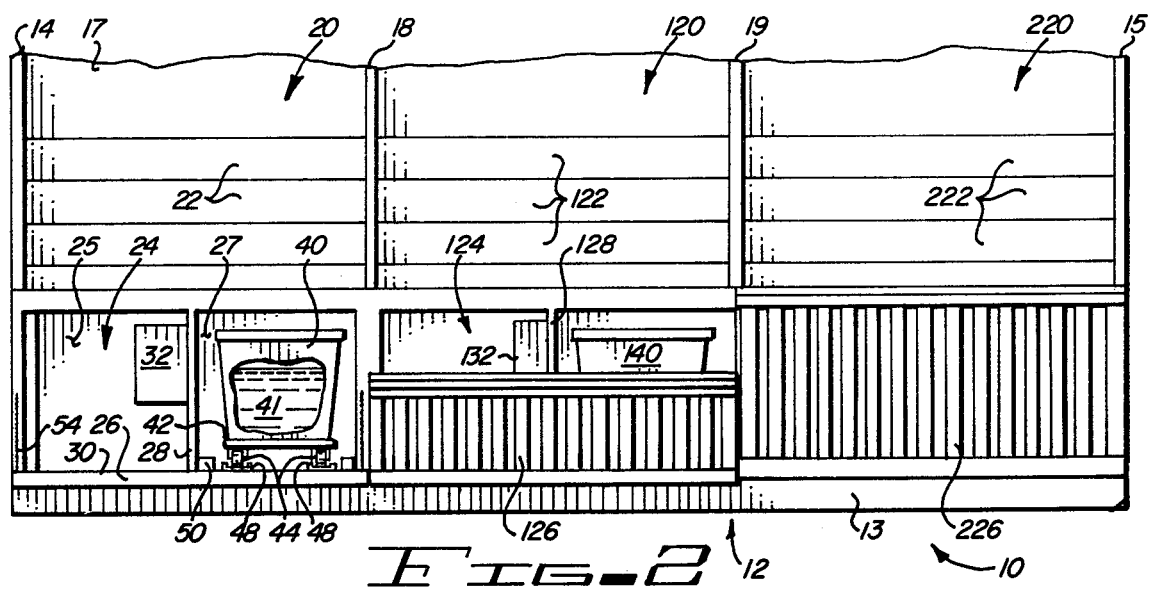
FIG. 2 is a front view of a portion of the apparatus of FIG. 1.

FIGS. 1 and 2 also show various decorative and structural features, such as braces, moldings, and panels which, with many alternatives, are all well known in the art, and which are shown merely for illustrative purposes.

A timer 132 is shown secured to the partition 128 within cabinet 124 remote from the tank 140. The timer is set for the number of minutes desired for accomplishing the watering of the plants in the trays 122 of section 120. Accordingly, the timer controls a water pump within the tank 140. The timer and the electrical controls will be discussed in more detail below.

A pair of water conduits 60 and 80 are shown extending into the tank 40. The conduit 60 is a supply line for supplying water from the tank to the trays 22 in section 20. The conduit 80 is a return or drain line for allowing water to return to the tank from the trays 22. The conduits are connected to opposite ends of the trays. As will be clearly shown and discussed below, the supply line 60 also acts as a return line for returning water from one end of the trays, while the conduit 80 returns water to the tank from the opposite end of the trays.

FIG. 2 is a front view of a portion of the self-water apparatus 10 in FIG. 1, comprising a view of the lower portion of the housing 12 with the door 26 of section 20 in the open or down position, and the door 126 of section 120 at about its midpoint position between fully open or down and fully closed or up. The door 226 of section 220 is in its full up or closed position, substantially as shown in FIG. 1. The sides 14 and 15 and the dividers 18 and 19 are shown in FIG. 2 in an end view. The back 17 extends completely across the apparatus from side 14 to side 15, and is, of course, appropriately secured to both sides 14 and 15 and also to the dividers 18 and 19. Beneath the trays in the respective sections, the back 17 comprises the back or rear end wall of the cabinets 24 and 124, and also the back or rear end wall of the cabinet beneath the trays 222 in section 220. With the back 17 comprising a rear end wall for the cabinets, the respective doors comprise the front wall for each cabinet.

As stated above, the partitions, such as partitions 28 and 128 of cabinets 24 and 124, respectively, divide the cabinets into two compartments. Partition 28 divides cabinet 24 into two compartments, a compartment 25 and a compartment 27. Tank 40, on platform 42, is disposed within compartment 27, while a timer 32, and other electrical and control circuits is disposed within compartment 25. The back wall 17 is common to all compartments in the apparatus. Similarly, floor 30 is common to all compartments in the apparatus.

With door 26 shown in its full down position, supported by a pair of chains 54, a pair of guides or tracks 48 for wheels 44 are shown secured to the door 26. A stop 50, also secured to the door 26, is shown partially broken away. The stop 50 defines the limit of movement of the tank 40 on the platform 42 and the stop is accordingly disposed at the outer end of the guides 48. The wheels 44 are free to roll in the guides 48 until they contact the stop 50, which prevents the platform and tank from rolling off the door 26. If desired, the stop 50 may comprise a pair of shorter stops disposed one against each guide, rather than a continuous stop extending across both guides 48.

The tank 40 is periodically rolled out of compartment 27 to check the level of water 41 within the tank. Water must be periodically replenished and/or changed, as circumstances warrant.

As indicated above, the sections 20, 120, and 220, are substantially identical, and accordingly the cabinets within the sections, and the trays above the cabinets are also substantially identical. However, each section is watered from its own tank and the watering is controlled by a timer, such as timer 32 for section 20, and timer 132 for section 120 (see FIG. 1), separate and independent from the timers in the other cabinets. The amount of water required for the various trays in each section may vary, and the amount of water required may vary from section to section, depending on the types of plants and the quantity of plants in each section. Since the quantity and type may vary from section to section, each section preferably has its own independent water supply system.

FIG. 3 is a schematic view of a portion of the apparatus of FIG. 1, taken generally along line 3—3 of FIG. 1. It illustrates, schematically, the water supply and return system of the electrical system of section 120 of apparatus 10. The water and electrical systems, including both water supply and return, for each section are substantially alike, although they are independently controlled, as indicated above.

Water tank 140 is shown disposed on platform 142 which in turn is movable on wheels 144. The wheels 144 are contained in the guides or tracks 146. A stop 152 is shown secured to floor 30 at the rear portion of the section, adjacent the back or rear wall 17. The stop limits the movement of the platform and the tank rearwardly as the wheels 144 contact or abut the stop.

Within the tank 140 is a quantity of water 141. A submersible pump 156 is disposed within the tank 140 and in the water 141. The pump 156 is an electrical pump controlled by timer 132. The timer 132 is in turn connected to a source of electrical current, such as a nominal 110 volt alternating current source through a pair of conductors 134 and 135. Electrical current flows between the timer 132 and the pump 156 through another pair of electrical conductors 136 and 137. The conductors 134 and 135 may be connected to a switch disposed within cabinet 124. The switch may in turn be connected to an input line to provide electrical current for each of the independent water systems, in parallel relationship. The electrical system is appropriately grounded.

With respect to the water system illustrated in FIG. 3, pump 156 is connected to a supply conduit 160 which includes four branch conduits, supply branch 162, supply branch 166, supply branch 170, and supply branch 174. Each of the branches extends to one of the plurality of trays 122a, 122b, 122c, and 122d. Each branch includes a valve which may be adjusted to control the supply or volume of water from the tank, through the pump, and to each tray. Valves 164, 168, 172, and 176 are respectively in the supply branches 162, 166, 170, and 174. As discussed above, and as illustrated below in FIG. 4, the supply branch conduits are connected to the trays at one end of each tray, while the drain conduits, or the drain branch conduits, are connected to the other or opposite end of the trays.

Drain or return conduit 180, which empties into, or terminates at, the tank 140, also includes four branches, branch conduits 182, 184, 186, and 188, each of which is connected respectively to the trays 122a, 122b, 122c, and 122d. The drain or return branch conduits do not include valves, but simply are open lines that allow for the unimpeded flow of the water from the trays to the tank.

Four trays 122 are shown in FIG. 3. The trays are substantially identical, and for purposes of differentiating them alphabetic designations of a, b, c, and d, have been given to them. Tray 122a, which is the uppermost tray, is shown connected to the return branch conduit 182, while the return branch conduits 184, 186, and 188 are connected respectively to trays 122b, 122c, and 122d. As previously indicated, the trays are arranged in a stepwise fashion from the lowest tray, 122d, which is at the front of the apparatus, to the highest tray, 122a, which is disposed at the back of the apparatus, adjacent back 17. The trays are shown in cross section, and each of them is a generally rectangular trough, including a pair of spaced apart sides, a pair of spaced apart ends, and a bottom. The construction of each tray will be discussed in more detail below, in conjunction with FIG. 4.

With respect to tray 122a, shown in partial section, the tray includes a pair of generally parallel and spaced apart sides 192 and 193, an end 191, and a bottom 195, all of which are sealingly secured together so that the tray will hold water,. For ease of maintenance, as well as cost and weight the trays are preferably made of plastic or fiberglass. Other appropriate materials, or combinations of materials, may also be used.

The drain branch conduit 182 is sealingly secured to the bottom 195 of the tray. A portion of the drain branch conduit 182 extends through the bottom 195 and terminates in an interior upright drain conduit portion 183 within the tray. A cap 210 is in turn disposed on the interior upright drain conduit 183. The cap 210 is movable vertically up and down, and also rotatably, on the interior upright drain conduit 183. Details of the cap and the upright portion will be discussed below in conjunction with FIGS. 4 and 5.

The construction of tray 122a, with its drain branch conduit or line 182, and the interior upright drain conduit portion of the drain line within the tray, are common also to the other trays 122b, 122c, and 122d, and to their respective drain lines 184, 186, and 188.

FIG. 4 is a schematic representation of a single tray illustrating the water supply and return system for each tray. A tray 122a is shown in partial section, connected to water supply branch conduit 162 at one end of the tray 122a, and water drain or return branch conduit 182 at the opposite end of the tray from the connection to the supply branch conduit 162.

The tray 122a is in partial section, showing only a pair of ends 190 and 191, which are spaced apart from each other and are generally parallel to each other, and which comprise end walls for the tray. A pair of sides, which are also generally parallel to each other and spaced apart from each other, are secured to the ends 190 and 191. One of the sides, a side 192, is shown in FIG. 4. The bottom of the tray is divided into two generally planar sloping portions, a portion 194 and a portion 195. The portions 194 and 195 of the bottom slope upwardly from adjacent the ends 190 and 191, respectively to a peak or ridge 196 which is generally centrally disposed between the two ends 190 and 191 and which extends between the sides. The slope of the bottom portions is conversely downward from the ridge to the ends. The bottom portions, side portions and end portions are all secured to each other to provide a tray 122a which is waterproof. The downward slope of the bottom portions 194 and 195 from the ridge 196 to the respective ends of the tray is not great, but it is sufficient to allow the water to drain in an expeditious manner from the peak or ridge 196 towards each end of the tray, as will be described in detail below.

Disposed on the bottom of the tray, between the ends 190 and 191, are a pair of mats, including a filter mat 197 and a mat topping 198. The filter mat 197 is preferably of a foam type which filters the water flowing into and out of the tray without substantially or materially impeding the inward and outward flow of the water. The mat topping 198 is simply a top or additional layer to the filter mat, comprising a relatively smooth, one-layer, open lattice type mat with relatively large spaced apertures therein. The apertures are relatively large so as to also not impede the flow of the water and yet are small enough to filter large pieces or particles of foreign material. The mat topping is smooth so that it can be wiped off easily. The two mat elements, the filter mat 197 and the mat topping 188, accordingly complement each other in the filtering and in the ability of the mat topping to be cleaned and wiped off due to its relatively smooth surface.

Plants, in normal containers, which are well known in the industry, are disposed within the trays on top of the mat topping.

The supply conduit 160 extends upwardly from cabinet 124 (see FIG. 3). Branch conduit 162 connects with the supply conduit 160 and extends to the tray 122, where it is secured to the bottom portion 194 of the tray adjacent the end wall 190. The conduit 162 is secured to the bottom 194 and the top of the conduit is flush with the upper portion of the bottom 194, as shown at 163 in FIG. 4. The valve 164 is disposed in the branch conduit 162 to allow the flow of water through the conduit 162 to the tray to be adjusted, as desired. When the pump 156 (see FIG. 3) is turned on, the individual flow to each tray may be varied by the respective valves in the conduits or lines, such as by the valve 164 in line 162. The flow of water to each tray may be selectively varied as desired, depending on the number and size of the plants disposed in each tray.

For drainage purposes, the valves, such as valve 164, and the pump 156 allow for the water to flow downwardly through them to the tank 140. Accordingly, when the pump 156 is turned off, the water within the tray 122 is allowed to drain from the tray, backwardly through the supply branch conduit 162, the supply conduit 160, and through the pump 156 to the tank 140. Thus, when the pump turns off, the water within each tray 122 drains in two directions from, as illustrated in FIG. 4, the peak 196 along each of the bottom portions 194 and 195, respectively, through the supply conduits 162 and 160 and the drain conduits 182 and 180.

The design of the drain portion of the apparatus is substantially different from that of the supply conduits and the supply portion of the water system. For illustrative purposes, drain conduit 180 is shown relatively narrow in diameter, while its branch drain conduit or line 182 is enlarged to illustrate its design within the tray 122. Obviously, the drain conduit 180, and its branch conduits, including branch conduit 182, are either the same size, or else the main or primary drain conduit 180 is larger than the various branches, such as branch 182. However, in FIG. 4, for illustrative purposes, the branch conduit 182 has been enlarged to show various features of the system.

The drain branch conduit 182 extends upwardly through the bottom portion 195, to which it is sealingly secured, and into the interior of the tray. The interior upright drain conduit portion 183 of the branch 182 is disposed within the tray. The filter mat 197 and the mat topping 198 both include circular apertures extending therethrough to allow the interior upright drain conduit 183 to extend through them and into the tray.

A pair of diametrically opposed apertures 200 and 202 extend through the interior drain conduit 183, with the bottom of the respective apertures about flush with the bottom of the tray. The apertures comprise drain holes for draining water from the tray. The drain apertures 202 and 204 are relatively large, to facilitate the flow of water therethrough. For example, the drain conduit branch 182 may typically be three-quarter inch schedule 40 plastic pipe, and the drain apertures typically are ¼ of an inch in diameter. Disposed on top of, and externally on, the upright interior drain conduit 183 is the cap 210. The cap 210 is disposed over, or on top of, the interior drain conduit 183 in a sliding fit and is accordingly adjustable. The inside diameter of the cap 210 is about the same as the outside diameter of the drain branch conduit 181 and its upright interior drain conduit portion 183, and the fit of the cap about the conduit is tight enough so that it remains in position, but it may be adjusted vertically up and down, as desired.

A plurality of apertures 216 extend radially inwardly of the cap and also comprise drain holes for enhancing the drainage of the water from the tray. The holes or apertures 216 are preferably about the same size as the drain apertures 200 and 202. In the example above given, the apertures 216 would be about one-quarter inch in diameter. The holes or apertures 216 are preferably equally spaced about the exterior periphery of the cap 210. Typically, for the size pipe given in the example above, there would be about eight holes or apertures equally spaced and extending through the cap, in a radial fashion. The holes or apertures accordingly allow water to flow therethrough into the interior of the cap and into the interior of the drain conduit portion 183. The cap 210 is of a cylindrical configuration, with the holes 216 disposed at the upper portion of the cap.

The cap 210 includes a cylindrical skirt 212 and the apertures 216 extend through the skirt 212 at the upper portion of the skirt, adjacent the top (see FIG. 5). The water level is determined and is maintained within the tray according to the adjustment of the cap 210 on the upright drain conduit 183. The apertures 200 and 202 on the upright drain conduit 183 provide for the continual draining of water within the tray, but the volume of water flowing through the two apertures is less than the total inward flow or supply of water through the supply conduit 162 and accordingly the level of the water will rise within the tray. However, the apertures 216, together with apertures 200 and 202, are of sufficient area to maintain the out flow or drainage of the tray at the same rate as the in flow of the water. Therefore, as the cap 210 is adjusted up or down on the interior upright drain conduit 183, the water level adjusts in the tray to the height of the apertures 216, and as the cap 210 is moved up or down on the relatively rigid interior upright drain pipe portion 183, the level of the water in the tray varies.

FIG. 5 is an enlarged perspective view, partially exploded, of a portion of the apparatus of FIG. 4. The drain conduit or pipe 182 is shown extending upwardly through the bottom 195 and the vertically extending or upright interior portion 183 of the drain conduit or pipe 182 is shown extending upwardly above the bottom 195. The drain aperture 200 is shown with its bottom portion adjacent the juncture of the interior upright portion 183 of the drain conduit 182 and the top portion of the bottom 195 of the tray 122a (see FIG. 4).

Cap 210 is shown exploded from, or separated upwardly from, the interior upright drain conduit 183 of the drain conduit 182. The cap 210 is shown with its skirt portion 212 extending downwardly from a top 214. The skirt extends substantially perpendicularly to the top 214, and the skirt and the top accordingly comprise a cylinder with a closed top and an open bottom. The apertures 216 extend radially through the skirt to communicate with the interior of the cap. Centrally disposed on the top 214, and extending therethrough, is an aperture 218. With the cap 210 disposed on the interior upright drain conduit 183 of the drain conduit 182, the aperture 218 is oriented with respect to the longitudinal axis of the drain conduit 182 and its interior upright portion 183.

The interior upright drain conduit 183 includes a pair of oppositely disposed V cuts 204 and 205 which extend downwardly from the upper or top portions of the conduit. The two V cuts are relieved portions which extend axially downwardly, with the width of the cut decreasing axially downwardly. The bottoms of the cuts terminate slightly above the bottom 195 of the tray, preferably at or above the tops of the drain holes 200 and 202 (see also FIG. 4).

The cuts or relieved portions 204 or 205 extend downwardly from peaks 206 and 207 of the interior upright drain conduit 183. Peak 206 comprises the top or uppermost portions of a side 208, and peak 207 comprises the top of side 209. That is, the cuts 204 and 205 extend downwardly from oppositely disposed peaks 206 and 207. The sides 208 and 209 are the sides or wall portions of the upright drain conduit or pipe 183 between the cuts 204 and 205.

The edges of the cuts 204 and 205 are continuously curving downwardly from the peaks 206 and 207 to the bottom of the cuts due to the fact that the cuts are in a curved, cylindrical surface, rather than in a flat planar surface. The cuts comprise notches through which the water drains from the tray into the drain conduit and back to tank 140 (see FIG. 3).

The lowermost position of the cap is when the underneath side of the top 214 is disposed on the peaks 206 and 207. In such an orientation, a minimum amount of the cuts or relieved portions 204 and 205 is exposed to the apertures 216. As the cap 210 is selectively raised on the drain conduit 183, an increasing amount of the cuts registers with the apertures 216. As the area of cuts and apertures exposed to each other increases, the greater the flow of water through the apertures and into the drain pipe. Conversely, the less exposure or registration between the cuts and the apertures 216, the less the flow of water from the tray and into the drain pipes. Accordingly, the flow of water may be selectively regulated or varied by vertical movement of the cap 210 on the drain pipe 183.

The drainage or return of the water to the tank is, of course, by gravity, but due to the design of the drain apparatus, including the interior upright drain conduit 183, with its drain apertures 200 and 202, and its cuts 204 and 205, together with the cap 210 and its radial apertures 216 and its aperture 218 in the top 214 of the cap, there is a suction effect to the water that aids in the rapid draining of the water. The hole or aperture 218 in the top of the cap provides for proper drainage by allowing air to flow axially downwardly with the water, and the flow of air in turn enhances the flow of water by combining to provide a suction effect for the drain age of the water. The hole 218 also comprises an emergency drain hole for the draining of water in an overflow situation.

In operation, the various trays are loaded with containers of plants. Preferably, the various types and sizes of plants are placed together in an organized arrangement in the trays. For example, the larger plants may be placed in one tray, while plants of other sizes may be placed in other trays, according to the groupings of the plants. In this manner, the flow of the water through the trays may be appropriately adjusted to provide the correct amount and flow of water for sufficient watering of the plants in each tray. The flow of water, as opposed to a prior art "flooding" situation, provides several functions, including wetting the soil or potting compound to provide moisture for the plants, dissolving plant foot placed in the soil or potting compound at the greenhouse where the plants originated, and accomplishing the functions faster and more efficiently than by flooding. Smaller plants need less water than larger plants, and accordingly the flow of water to each tray is adjusted by the valves in the various branches of the supply line 160 (see FIG. 3).

Watering of the plants is accomplished only when necessary, as determined by the conditions of the plants. Plant should dry out between watering so as to prevent the roots from rotting or from contracting various diseses. Visual inspection and examination of the soil or potting compound for the plants is required to determine when the plants should be watered. Temperature and humidity conditions may vary from location to loction, and even from day to day in a particular location. The temperature and humidity have their effects on the drying out of the plants, and the length of time between waterings accordingly varies. An operator therefore must make periodic inspections of the plants to determine when the plants should be watered.

By appropriate adjustment of the valves in the supply lines, the amount and flow of water through each tray is varied to provide the appropriate amount of water for the plants within the trays of each section. When it is desired to water the plants in the trays, electrical power is provided to a pump through a timer. The timer determines the amount of time that electrical power is transmitted to the pump, and is generally only for a few minutes. If a longer watering period is desired, than say for two or three minutes, the timer is adjusted. Accordingly, a single operator may simply turn the power on, and the timer then controls the length of time that the pump operates and the operator need not be physically present to turn off the pump after the desired amount of time has elapsed. By use of the valves, the appropriate amount of water flows into each tray from a single pump.

With the drain apparatus as described, the water flows through the tray and returns by the drain pipes to the tank. Thus there is a continual flow of water through the tray. This actual flow of water enhances the watering of the plants so that the watering is accomplished in a much faster manner than with the prior art. The prior art is typified when the water is simply placed into a tray, the tray fills to a certain level, and the water is allowed to stand for a relatively long period of time while the plants absorb the water. Due to the flowing action of the water in the tray in the present apparatus, the water is absorbed by the plants, or rather by the soil or potting compound in which the plants are disposed, and in turn the plants are subject to the water through their root systems.

The water is filtered both "coming" and "going" through the filter mat 197 and the mat topping 198 (see FIG. 4). Moreover, when the pump turns off, and the water drains from the trays, the bottoms of the plant containers are completely free from the water since the containers are disposed on and supported by the filter mat and the mat topping. Hence, no residual water remains either in the trays or at the plants to prevent the plants from drying out and to foster the problem of root rot and disease. To speed up the draining process, the water drains not only through the drain conduits, but also back through the supply conduits and through the pump to the tank. The purpose of the apparatus is to water the plants as fast as possible and then to let them dry prior to the next watering. The water comes into the trays at one side, flows across the trays, and then drains back to the supply tank. By this process, the watering is accomplished in a matter of only a few minutes, such as two, three, or four minutes, and is only required, under "normal" circumstances, once or twice a week. It is obvious that the described apparatus should be level to insure proper supply and drainage.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. For example, while a submersible pump is shown, other types could be substituted. Moreover, flexible supply and drain hoses or conduits may be used, at least from the tank to the interior of the cabinet to facilitate movement of the tank without moving, disconnecting, etc. the conduits at the tank. Also, while the term "water" has been used throughout the specification and is found in the claims, it is obvious that a nutrient solution may also be used, or that nutrients may be added to the water as desired or as required. Moreover, while an automatic timer is illustrated as controlling a pump in each section, a manual switch may also be used to control the pump. The appended claims are intented to cover and embrace any and all such modifications, within the limits only of the true spirit and scope of the invention. This specifiction and the appended claims have been prepared in accordance with the applicable patent laws and rules promulgated under the authority thereof.

What is claimed is:

1. Watering and draining apparatus for plants, comprising, in combination:
   a tank for holding a quantity of water;
   tray means for holding plants;
   supply conduit means extending from the tank to the tray means;
   a valve in the supply conduit means for controlling the flow of water from the tank to the tray means;
   means for providing a flow of water from the tank to the tray means through the supply conduit means;
   return conduit means extending from the tray means to the tank for draining the water from the tray means to the tank, including
   an interior upright drain conduit disposed within within the tray means,
   drain aperture means in the interior upright drain conduit to provide a continual first flow of water from the tray means,
   cap means, including a top and a skirt extending downwardly substantially perpendicular to the top, disposed on the interior upright drain conduit and movably adjustable thereon,
   a plurality of apertures extending through the skirt of the cap means and communicating with the interior upright drain conduit to provide a selectively varied second flow of water from the tray means,
   an aperture extending through the top of the cap means for admitting a flow of air into the return conduit means, and
   a relieved portion on the interior upright drain conduit selectively communicating with the plurality of apertures extending through the skirt of the cap means for varying the second flow of water from the tray to the return conduit means.

2. The apparatus of claim 1 in which the return conduit means includes a pair of oppositely disposed cuts on the interior upright drain conduit for varying the second flow of water from the tray means to the return conduit means.

3. The apparatus of claim 1 in which the tray means includes
   a first end,
   a second end,
   a first side secured to and extending between the ends;
   a second side spaced apart from the first side and extending between and secured to the ends;
   a first bottom portion and a second bottom portion, both of which bottom portions are secured to and extend between the respective first and second sides, and the first bottom portion is secured to the first end and the second bottom portion is secured to the second end; and
   the supply conduit means is secured to the first bottom portion adjacent the first end, and the return conduit means is secured to the bottom portion adjacent the second end, said first and second bottom portions providing for the draining of water from the tray means.

4. The apparatus of claim 3 in which the drain aperture means includes a pair of apertures extending through the interior upright drain conduit adjacent the second bottom portion of the tray means.

5. The apparatus of claim 3 in which the pump means includes a pump and a timer for controlling the pumping of the water by the pump.

6. The apparatus of claim 5 in which the pump of the pump means and the valve in the supply conduit means allow the water from the tray means to drain back to the tank through the supply conduit means and the pump when the pump is not pumping water to the tray means.

7. The apparatus of claim 3 in which the tray means includes mat means disposed on the first and second bottom portions of the tray means for filtering water flowing into and out of the tray means, and away from plants disposed on the mat means.

8. The apparatus of claim 7 in which the mat means includes a filter mat disposed on the first and second bottom portions, and a mat topping disposed on the filter mat, and the plants are disposed on the mat topping.

9. The apparatus of claim 1 which includes a housing and the tray means includes a plurality of trays disposed on the housing, and the tank is disposed within the housing and beneath the plurality of trays.

10. The apparatus of claim 9 in which the supply conduit means includes a supply conduit connected to the pump means and a plurality of supply branch conduits connected to the supply conduit and one of each of said plurality extending to one of each of the plurality of trays.

11. The apparatus of claim 10 in which the pump means includes a timer for controlling the pumping of the water from the tank to the tray means through the supply conduit means.

12. The apparatus of claim 10 in which each supply branch conduit of the plurality of supply branch conduits includes a valve for selectively controlling the flow of water through each of said branches to each tray of the plurality of trays.

13. The apparatus of claim 12 in which each tray of the plurality of trays includes a pair of ends and a pair of sides connected to and extending between the ends, and a bottom connected to and extending between the sides and the ends, and a ridge extends between the side for dividing the bottom into a first portion and a second portion, and the first portion of the bottom slopes downwardly from the ridge to one end of the pair of ends, and the second portion of the bottom slopes downwardly from the ridge to the other end of the pair of ends.

14. The apparatus of claim 13 in which the supply branch conduit for each tray extends to and is secured to the first portion of the bottom of the tray adjacent one end of the pair of ends.

15. The apparatus of claim 14 in which the return conduit means includes a return conduit extending from the tank and a plurality of return branch conduits, with one of each of the plurality of return branch conduits extending from the return conduit to one of each of the trays of the plurality of trays, and each return branch conduit is connected to its respective tray at the second portion of the bottom adjacent the other of the pair of ends of the tray and remote from where the supply branch conduit is secured to the first portion of the bottom.

16. The apparatus of claim 15 in which the cap means includes a top and a skirt extending downwardly from the top and disposed about the interior upright drain conduit and the plurality of apertures extends through the skirt of the cap means adjacent the top.

17. The apparatus of claim 16 in which the interior upright conduit of the return conduit means includes a first side and a second side spaced apart from each other and separated by a first relieved portion and a second relieved portion, and the plurality of apertures extending through the skirt of the cap means communicates with the relieved portions as the cap means is moved on the interior upright drain conduit to control the second flow of water from the tray means to the tank.

18. The apparatus of claim 17 in which the first and second relieved portions comprise V shaped cuts oppositely disposed from each other on the interior upright drain conduit of the return conduit means.

* * * * *